United States Patent
Vogt

(10) Patent No.: US 6,862,515 B2
(45) Date of Patent: Mar. 1, 2005

(54) METHOD, COMPUTER PROGRAM AND CONTROL ARRANGEMENT FOR OPERATING AN INTERNAL COMBUSTION ENGINE

(75) Inventor: Bernhard Vogt, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 09/978,678

(22) Filed: Oct. 18, 2001

(65) Prior Publication Data

US 2002/0045983 A1 Apr. 18, 2002

(30) Foreign Application Priority Data

Oct. 18, 2000 (DE) .......................................... 100 51 551

(51) Int. Cl.$^7$ ............................................. G06F 17/00
(52) U.S. Cl. ........................ 701/104; 701/115; 123/357; 123/478
(58) Field of Search ................................ 701/104, 105, 701/115, 114; 123/350, 357, 478

(56) References Cited

U.S. PATENT DOCUMENTS

| 4,387,429 | A | * | 6/1983 | Yamauchi et al. | 701/105 |
| 4,454,847 | A | * | 6/1984 | Isomura et al. | 123/492 |
| 4,643,152 | A | * | 2/1987 | Yamato | 123/480 |
| 5,033,439 | A | * | 7/1991 | Eygret | 123/491 |
| 5,445,129 | A | * | 8/1995 | Barnes | 123/446 |
| 6,170,459 | B1 | * | 1/2001 | Ono et al. | 123/305 |
| 6,276,337 | B1 | * | 8/2001 | Minato | 123/456 |

* cited by examiner

*Primary Examiner*—Willis R. Wolfe
*Assistant Examiner*—Johnny H. Hoang
(74) *Attorney, Agent, or Firm*—Walter Ottesen

(57) ABSTRACT

In a method for operating an internal combustion engine (10), the fuel is supplied via at least one injection valve (32). The injected fuel quantity is influenced by the injection duration (ti). To reduce costs for the design and acquisition of the injection valve (32), it is proposed to detect as to whether a requested injection duration (ti) of the injection valve (32) is greater than a maximum possible injection duration (timxth). In this case, an intervention (64) takes place with which a desired mixture composition (rlmaxti) is produced.

16 Claims, 3 Drawing Sheets

METHOD, COMPUTER PROGRAM AND CONTROL ARRANGEMENT FOR OPERATING AN INTERNAL COMBUSTION ENGINE

FIELD OF THE INVENTION

The invention relates to a method for operating an internal combustion engine wherein fuel is supplied via at least one injection valve and the injected fuel quantity is influenced by the injection duration.

BACKGROUND OF THE INVENTION

A method of this kind is known in the marketplace wherein fuel is injected into an intake manifold via an injection valve. In other known methods, the fuel is injected directly into the combustion chamber. The known method is applicable to gasoline as well as to diesel. The injected fuel becomes a mist in the intake manifold and is transported into a combustion chamber of the engine. The fuel is supplied to the injection valve from a fuel feedline which is under an essentially constant pressure. If, for example, a high load is requested by the driver, the injection valve is so driven that it remains open for a relatively long time. In this way, a larger quantity of fuel enters the intake manifold.

The maximum possible injection duration of the injection valve is, however, limited. If, for example, in gasoline-direct injection, a discrete opening operation of the injection valve is wanted, then the maximum possible injection duration is equal to the duration of the induction stroke plus, if required, the compression stroke. For intake manifold injection, the injection valve can, in the extreme case, also be open continuously. However, it would be more advantageous to have here also a discrete opening operation because injection should not take place into an open inlet valve. Accordingly, the injection valve should be closed when the inlet valve is open.

If the operator of the engine requests a high load (that is, for example, a high torque with a possibly high rpm), it can happen that the requested injection duration of the injection valve is longer than the maximum possible injection duration. The maximum possible injection is, however, limited by the engine. For this reason, only a fuel quantity is injected which corresponds to the maximum possible injection duration notwithstanding this higher requested injection duration. At the same time, an air charge is supplied to the combustion chamber which corresponds in quantity to the requested high torque so that the mixture, which enters the combustion chamber, is overall too lean. This leads, on the one hand, to a poor emission performance and, on the other hand, to an increased temperature of the engine and the exhaust gas.

High exhaust gas temperatures, in turn, are damaging for the exhaust-gas system. Furthermore, exhaust gas temperatures, which are too high, are especially unwanted when the engine has a compressor (for example, a turbocharger), which precompresses the intake air in specific operating states. The turbine of the turbocharger disposed in the exhaust-gas flow is exceptionally temperature sensitive and can be damaged by an exhaust-gas temperature which is increased to this extent. For this reason, especially in the full-load range, an enrichment of the mixture takes place in order to reduce the exhaust-gas temperature. This is not possible when the engine is already operated in the state wherein the injection duration can no longer be extended.

The use of a fuel having a lower octane number is also made more difficult because, in this case, the engine should be operated with a retarded ignition angle in order to avoid knocking. However, this retarded ignition angle causes the exhaust-gas temperature to be increased. This would have to be countered with an enrichment of the mixture, which is not possible when the injection valve is already operated at the maximum possible injection duration.

In order to avoid the above-mentioned problems, a most precise design of the injection valve is required. This must take place so that it is ensured in each operating state that an adequate fuel quantity can be injected. This leads, in general, to the demand for an injection valve which can inject a relatively large quantity of fuel. During idle of the engine, it is, however, required that the injection duration of the injection valve be only very short. The injection valve must supply only a very low quantity of fuel to the combustion chamber of the engine, especially for an active tank venting where fuel vapor is conducted directly from the tank into the intake manifold. In order to properly consider all these requirements, the injection valve must therefore have a very large variation range, that is, it has to be able to inject the smallest quantities of fuel but also large quantities of fuel. Injection valves of this type are, however, very expensive.

SUMMARY OF THE INVENTION

In view of the foregoing, it is an object of the invention to improve upon a method of the above-mentioned type so that the internal combustion engine can be operated with a relatively cost-effective injection valve which is simple to design.

The method of the invention is for operating an internal combustion engine and includes the steps of: injecting fuel via at least one injection valve and influencing the amount of the injected fuel by influencing the injection duration; detecting when a demanded injection duration is greater than a maximum possible injection duration (timxth); and, if so, intervening to produce a desired mixture composition.

The suggested method is simple as well as effective. According to the invention, it was recognized that almost all problems, which occur when the injection valve of the engine is operated at the maximum possible injection duration, relate to the situation that, in this case, the exhaust gas becomes too hot. This, in turn, can be attributed to the fact that possibly too little fuel reaches the combustion chamber, that is, that the air/fuel mixture is too lean. According to the invention, it is suggested that the control of the air/fuel mixture is no longer power orientated but mixture orientated as soon as it is detected that the maximum possible injection duration of the injection valve is exceeded.

In this way, it is ensured in all operating situations of the engine that the mixture is not too lean and corresponds to the wanted mixture composition even when the injection valve is operated at the maximum possible injection duration. In the normal case, this is a mixture which is essentially stoichiometric but can also be an enriched mixture, for example, to protect a turbine mounted in the exhaust-gas line.

The use of injection valves, which can also inject relatively large quantities of fuel, is therefore no longer required to the extent that was needed up to now. In practice, valves should be sufficient which are approximately 10% to 20% smaller than valves used up to now. Lower requirements are imposed on the design of injection valves because the different boundary cases, of which some were set forth as exemplary initially herein, need basically no longer be considered. In this way, costs are saved already in the design of the engine. This is especially so since, advantageously, because of the desired use of like parts, differently large internal combustion engines can be equipped with like injection valves. The corresponding injection valves are furthermore more cost-effective so that here too costs are saved. Furthermore, engine damage or damage on other components of the engine is avoided, which could occur when a limit situation is overlooked when designing the injection valve.

In a first embodiment of the invention, the intervention includes limiting an air charge of a combustion chamber. In this way, the air component of the air/fuel mixture is adapted to the maximum possible injection quantity of fuel.

The air charge can be especially easily reduced in that the angle of the throttle flap is adjusted. In this way, the throughput cross section of the intake manifold is reduced so that less air can flow through the intake manifold into the combustion chamber.

In internal combustion engines having precompression and which therefore have a compressor in the intake manifold, the air charge can also be reduced in that the charge pressure in the intake manifold is reduced. This is, for example, especially simple to realize with a waste gate.

To make possible a precise intervention, it is advantageous when the extent of the intervention is adapted to the deviation between the requested and maximum possible injection duration. In a further embodiment of the method according to the invention, it is therefore suggested that the intervention takes place by means of a characteristic line whose input quantity is the difference between the requested and maximum possible injection durations.

In lieu of directly influencing the air charge of the combustion chamber, the intervention can also include a reduction of the desired torque. In this case, a component of the air/fuel mixture is not changed separately but intervention into the control path is made significantly earlier. This affords the advantage that the mixture control itself remains unaffected.

When the desired torque is reduced (which, in general, is proportional to the air charge), then this can take place especially accurately when the invention takes place by means of a controller, especially by a PI controller whose actuating quantity is the difference between requested and maximum possible injection durations.

All of the above embodiments are directed to a reduction of power which takes place when an injection duration of the injection valve is requested which is longer than the maximum possible injection duration. Alternatively, or in addition, the intervention can also include an increase of the fuel pressure. In this case, the requested power continues to be available, that is, the drop in power is less.

The invention also relates to a computer program which is suitable for carrying out the above method when it is carried out on a computer. It is here especially advantageous when the computer program is stored on a memory, especially on a flash memory.

The invention also relates to a control arrangement (open loop and/or closed loop) for operating an internal combustion engine having at least one injection valve for supplying fuel which control arrangement outputs a desired value for the injection duration of the injection valve. In order to realize the advantages already set forth above in connection with the method of the invention, it is suggested that a control arrangement (open loop and/or closed loop) includes means which detect when the desired injection duration is greater than a maximum possible injection duration and that the control arrangement includes means which intervene in this case such that a desired mixture composition is provided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
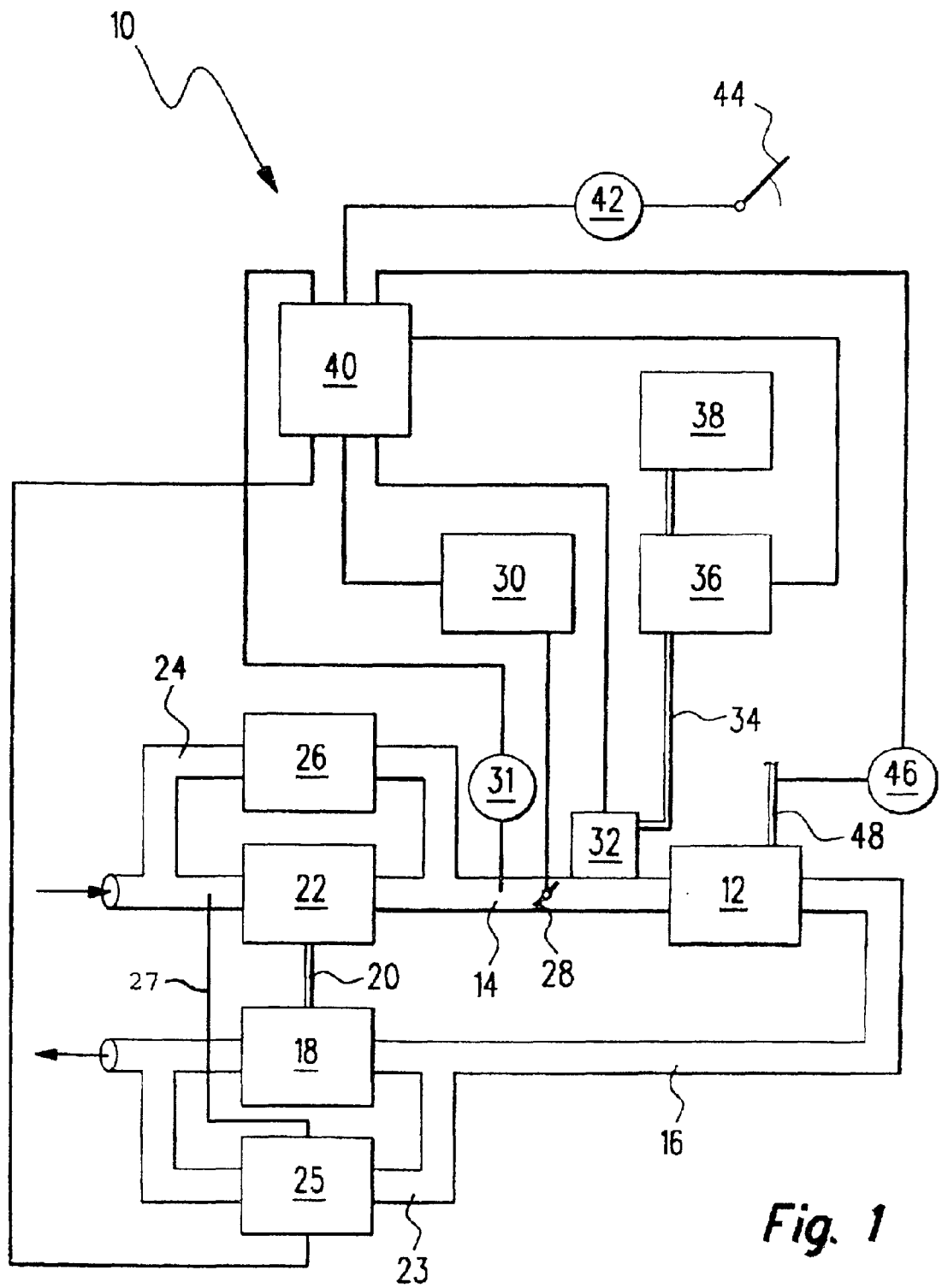
FIG. 1 is a block circuit diagram of an internal combustion engine.

In FIG. 1, the internal combustion engine is identified by reference numeral 10. The engine includes a combustion chamber 12 which is connected to an intake manifold 14 via an inlet valve (not shown). The combustion chamber 12 is also connected to an exhaust-gas pipe 16 via an outlet valve (not shown).

A turbine 18 is mounted in the exhaust-gas pipe 16 which drives a compressor 22 via a shaft 20. A waste gate line 23 leads past the turbine 18 and a waste gate 25 is mounted in line 23. The waste gate 25 is controlled via the pressure present in the intake manifold and this control is indicated by line 27. The compressor 22, in turn, is mounted in the intake manifold 14. An air circulation line 24 branches from the intake manifold 14 upstream of the compressor 22. The air circulation line 24 opens again into the intake manifold 14 upstream of the compressor 22. An air circulation valve 26 is mounted in the air circulation line 24.

A throttle flap 28 is further present in the intake manifold 14. The angular position of the throttle flap 28 is adjusted by an actuating motor 30 (the throttle flap 28 can, alternatively, also be actuated directly via a throttle cable). A hot film air mass sensor (HFM) 31 is mounted upstream of the throttle flap 28 and measures the air mass flowing through the intake manifold 14. An injection valve 32 is mounted between the throttle flap 28 and the combustion chamber 12 and fuel can be injected with the injection valve 32 into the intake manifold 14. The injection valve 32 is supplied from a tank 38 via a fuel line 34 and a fuel pump and pressure control unit 36.

A control apparatus (open loop and/or closed loop) 40 is connected at the input end to the HFM sensor 31 and to a position transducer 42 of an accelerator pedal 44. The control apparatus 40 further receives signals from an rpm sensor 46 which taps the rpm of a crankshaft 48. At the output end, the control apparatus 40 is connected to the waste gate 25 in the waste gate line 23 and to the actuating motor 30 of the throttle flap 28 as well as the injection valve 32 and the fuel pump and pressure control unit 36.

In a normal case, the internal combustion engine 10 is operated as described hereinafter.

Air is inducted via the intake manifold 14 during an induction stroke. A load requested by an operator is defined by the control apparatus in dependence upon the position of the accelerator pedal 44 determined by the position transducer 42 and the actuating motor 30 of the throttle flap 28 is correspondingly controlled in an air-guided system. If required, an intervention into the drive of the waste gate 25 can be provided to thereby adjust the charge pressure. The injection valve 32 is controlled by the control apparatus 40 in dependence upon the air mass determined by the HFM sensor 31 so that a desired mixture composition is obtained. Therefore, a specific quantity of fuel is injected into the intake manifold 14. The fuel quantity is determined by the opening duration of the injection valve 32. The exhaust gas discharged from the combustion chamber 12 drives the turbine 18 which, in turn, drives the compressor 22 via the shaft 20 in specific operating states of the engine 10. The compressor 22 precompresses the air in the exhaust-gas pipe 16.

It can be necessary to reduce the pressure in the intake manifold 14 under specific circumstances. This is brought about in that the waste gate 25 is so controlled that it opens. In this case, the exhaust gas can flow past the turbine 18 so that the turbine 18, and therefore the compressor 22, are driven at a lesser intensity.

As already explained above, the injected fuel quantity is determined by the duration of the injection by the injection valve 32. The higher the rpm of the engine 10, the shorter is the time which is available for the injection of the fuel. If, at a high rpm, a high power is requested of the engine 10 in that, at a high rpm, the operator depresses the accelerator pedal 44 still farther, it can happen that the fuel quantity, which is required for achieving this power, cannot be injected because too little time is available for the injection of the fuel. Accordingly, in this case, the requested injection duration of the injection valve 32 is greater than a maximum possible injection duration. Another situation of this kind can, for example, occur when the engine 10 is already operated with a continuously open injection valve 32 but an enrichment of the mixture should take place for the protection of the turbine 18 against overheating. Then, the method shown in FIG. 2 can be followed.

In this method, and after a start at block 50, it is first determined in block 52 how long the injection duration ti must be to achieve the power which corresponds to the position of the accelerator pedal 44 determined by the position transducer 42. In parallel to the foregoing, a quotient timxth is formed in block 54 from a factor F (block 56) and the rpm nmot (block 58) of the crankshaft 48 determined by the rpm sensor 46. The factor F is a quantity specific to the engine and results from the maximum possible injection duration at maximum rpm. The quotient timxth corresponds to the maximum possible injection duration of the injection valve 32 at the determined rpm nmot. In block 60, the difference between the requested injection duration ti and the maximum possible injection duration timxth is formed.

The value dtimx formed therefrom is checked in block 62 as to whether it is positive. If this is the case (that is, if the requested injection duration ti is greater than the maximum possible injection duration timxth), the desired air charge rides is set equal to a desired air charge rlmaxti in block 64. The air charge rlmaxti is such an air charge which provides a desired mixture in the combustion chamber 12 for the maximum possible injection duration of the injection valve 32 (at a desired enrichment for the thermal reasons set forth above, that is, a rich mixture, for example). The corresponding value is determined in block 65. Proceeding from the desired value rldes for the air charge, an angular position wdk of the throttle flap 28 is determined in block 66 (or, alternatively or in addition, a corresponding charge pressure is adjusted via the waste gate 25). A corresponding signal is outputted to the actuating motor 30. The method ends in the end block 68.

If it is determined in block 62 that the difference dtimx is equal to or less than zero, then, in block 70, the air charge is fixed in the usual manner in dependence upon the parameters (x, y). The parameters (x, y) can, for example, be the requested torque, an ambient pressure, et cetera.

Figure 2:
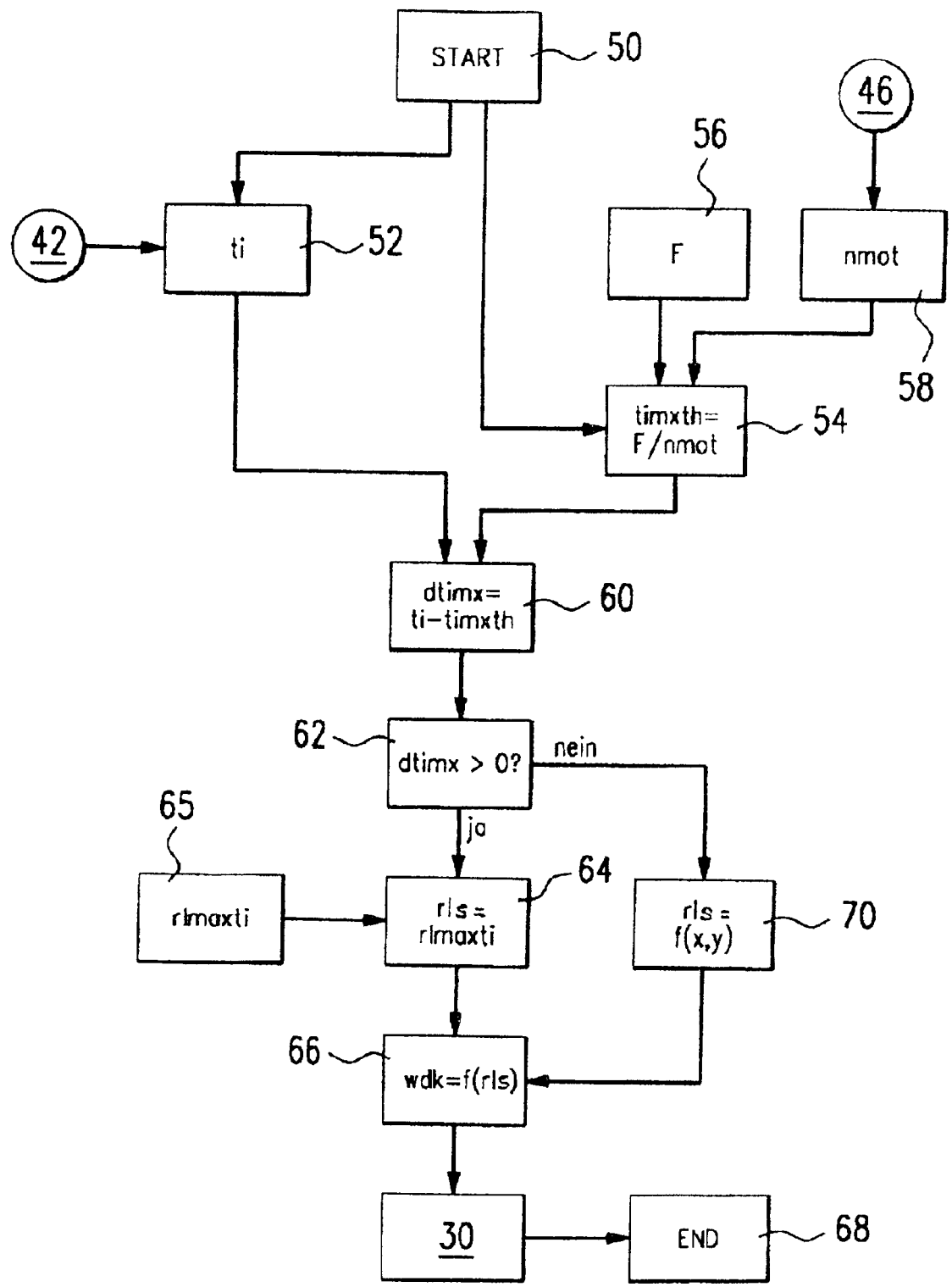
FIG. 2 is a flowchart of a first embodiment of a method for operating the engine of FIG. 1; and, FIG. 3 is a flowchart showing a second embodiment of the invention for operating the engine of FIG. 1.

With the method shown in FIG. 2, the air charge, and therefore the power of the engine 10, is so limited that a stoichiometric mixture is present in each case in the combustion chamber in the case when the requested injection duration ti exceeds the maximum possible injection duration timxth. The limiting of the air charge rl can also take place in that the waste gate 25 is opened and therefore the waste gate line 23 is cleared. In this way, the charge pressure in the intake manifold 14 is reduced which likewise has the consequence of a reduced air charge in the combustion chamber 12. Furthermore, and in lieu of a comparison in block 62, the difference between the requested injection duration ti and the maximum possible injection duration timxth can also be inputted to a characteristic line which outputs a corresponding air charge value.

Figure 3:
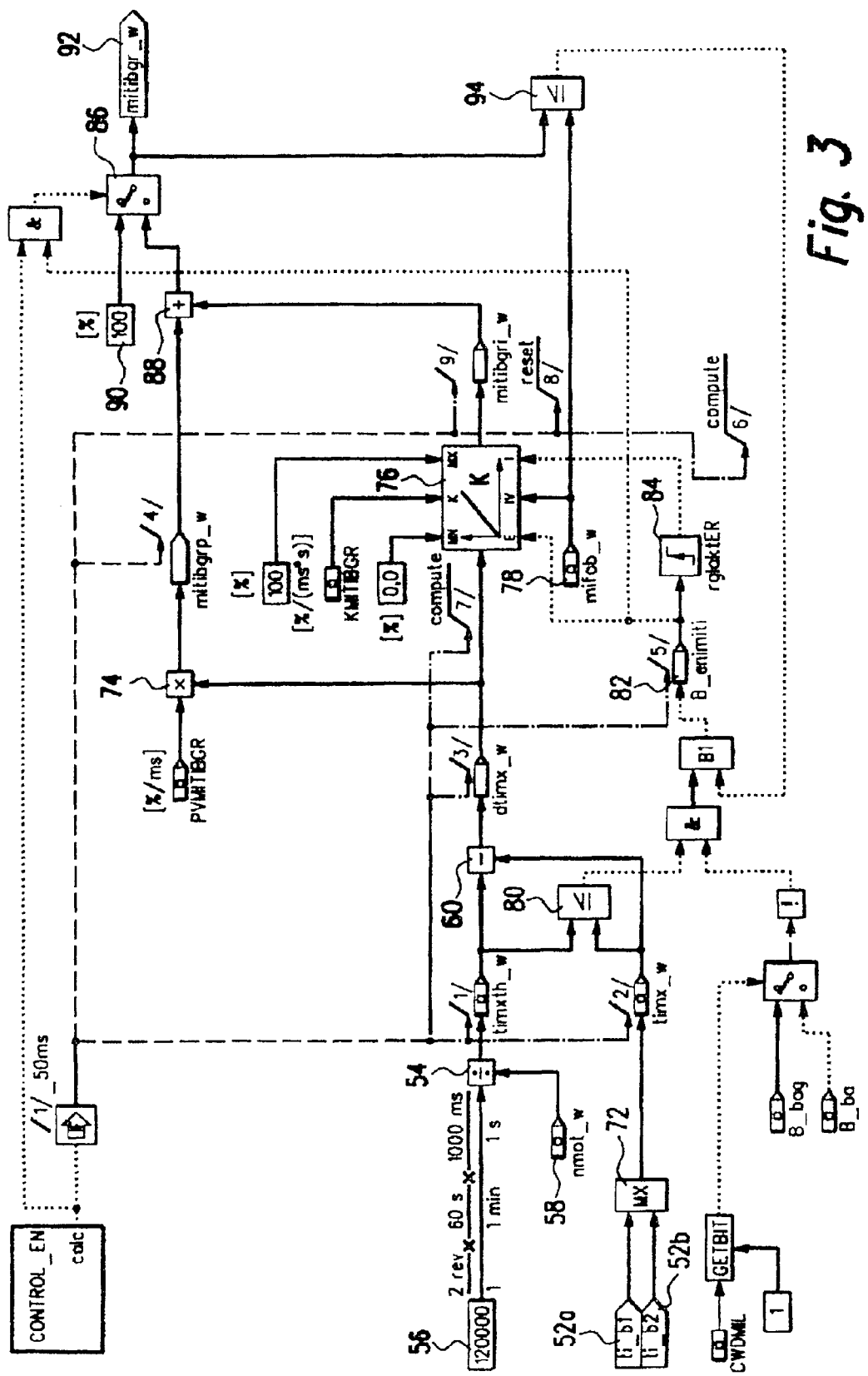

The air charge rl is limited in the embodiment shown in FIG. 2. In FIG. 3, an embodiment is shown wherein the desired torque mitibgr of the engine 10 is reduced. This takes place as follows (blocks and elements which have equivalent functions to corresponding blocks of the previous embodiment are provided with the same reference numerals).

The engine 10 includes two banks having injection valves. The corresponding desired injection durations are called ti_b1 and ti_b2 (blocks 52a and 52b). In block 72, the maximum value is formed from the two desired injection durations ti_b1 and ti_b2. At the same time, the maximum possible injection duration timxth is determined in block 54 from a factor F, which here has the value 120000 (block 56), divided by the engine rpm nmot in block 54. In block 60, a difference formation takes place from the values timx and timxth. This part of the method is still essentially identical to the method shown in FIG. 2.

This difference is multiplied by a proportionality factor PVMITIBGR in block 74. The result is a proportionality component mitibgrp of a P controller. In block 76, the difference dtimx is also fed into an integrator which outputs an integrally operating component mitibgri of an I controller. The integrator in block 76 is initialized by a driver request torque mifab (block 78). The blocks 76 and 74 form, in total, a PI controller which has a proportionality component mitibgrp and an integral component mitibgri of a desired torque mitibgr.

The controller is, however, only activated when the requested injection duration timx exceeds the rpm-dependent maximum possible injection duration timxth (if required, the activation can also take place earlier in order to maintain a safety interval to the maximum possible injection duration). This is determined by the comparator block 80 via which a bit B_enimiti is set in block 82. The corresponding increasing signal flank is recognized in block 84. The bit B_enimiti also operates on a switch 86 which outputs either the sum formed in block 88 from the proportionality component mitibgrp and the integral component mitibgri of the PI controller or a fixed value of 100% (block 90) as desired torque mitibgr in block 92. The deactivation of the PI controller takes place when the requested injection duration timx becomes again less than the theoretically possible injection duration timxth and when the desired torque mitibgr is greater than the driver command torque mifab (block 94).

In the method shown in FIG. 3, a PI controller is therefore activated as soon as an injection duration longer than possible is requested. In this case, the PI controller outputs a reduced desired torque mitibgr which, at a fixed ignition angle, has a reduced air charge as a consequence. The reduction takes place relatively smoothly because of the characteristics of the PI controller. The reduced desired torque mitibgr has, in each case, a value which guarantees a desired air/fuel mixture in the combustion chamber 12 for a maximum possible injection duration of the injection valve 32. This air/fuel mixture can be stoichiometric or can, if required, for example, also be enriched.

It should be noted that also an increased desired fuel pressure can be outputted by the PI controller in lieu of a reduced desired torque mitibgr. Then, corresponding signals would be outputted to the fuel pump and pressure control unit 36 by the control apparatus 40 in FIG. 1. In this case, the maximum engine power would be available. However, in this case, the fuel system and the injection valve would have to be designed for correspondingly high pressures even if this occurs only for a very short time.

In an embodiment not shown, the method described above is utilized for an internal combustion engine having gasoline direct injection. There, the, maximum possible injection duration would, however, not correspond to the condition wherein the injection valve is opened continuously but to an injection window pregiven by the engine stroke. Furthermore, the method can be used equally for gasoline and diesel engines.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine, the method comprising the steps of:
    injecting fuel via at least one injection valve and influencing the amount of the injected fuel by influencing the injection duration;
    detecting when a demanded injection duration is greater than a maximum possible injection duration (timxth); and
    if so, intervening to produce a desired mixture composition.

2. The method of claim 1, wherein the intervention includes limiting an air charge (rl) of a combustion chamber.

3. The method of claim 2, wherein the intervention includes shifting the angle (wdk) of a throttle flap.

4. The method of claim 2, wherein the intervention includes reducing at least one of the charge pressure and the intake manifold pressure.

5. The method of claim 1, wherein the intervention takes place with a characteristic line whose input quantity is the difference between the demanded injection duration and the maximum possible injection duration.

6. The method of claim 1, wherein the intervention includes a reduction of a desired torque (mitibgr).

7. The method of claim 6, wherein the intervention takes place with a controller whose actuating quantity is the difference (dtimx) between a demanded injection duration (timx) and a maximum possible injection duration (timxth).

8. The method of claim 7, wherein said controller is a PI controller.

9. The method of claim 1, wherein the intervention includes an increase of the fuel pressure.

10. A computer program comprising a program suitable for carrying out a method including the following steps when executing the program on a computer:
    injecting fuel via at least one injection valve and influencing the amount of the injected fuel by influencing the injection duration;
    detecting when a requested injection duration is greater than a maximum possible injection duration (timxth); and
    if so, carrying out an intervention with which a desired mixture composition is produced.

11. The computer program of claim 10, wherein said program is stored in a memory.

12. The computer program of claim 11, wherein said memory is a flash memory.

13. A control arrangement for operating an internal, combustion engine having at least one injection valve for metering fuel, the control arrangement comprising:
    means for outputting a desired value (ti) for the injection duration of said injection valve;
    means for detecting when said desired value (ti) is greater than a maximum possible injection duration (timxth); and
    means for intervening in this use so that a desired mixture composition is produced.

14. The control arrangement of claim 13, wherein said control arrangement is at least one of an open-loop and closed-loop control arrangement.

15. The method of claim 1, wherein said desired composition mixture is produced so as to not be too lean thereby preventing an unwanted increase in the temperature of said engine and in the temperature of the exhaust games.

16. A method for operating an internal combustion engine, the method comprising the steps of:
    injecting fuel via at least one injection valve and influencing the amount of the injected fuel by influencing the injection time duration;
    comparing a demanded injection time duration to a maximum possible injection duration to detect when said demanded injection time duration is greater than a maximum possible injection duration; and
    intervening to produce a desired mixture composition when the demanded injection time duration of said injection valve is greater than the maximum possible injection time duration.

* * * * *

UNITED STATES PATENT AND TRADEMARK OFFICE
CERTIFICATE OF CORRECTION

PATENT NO. : 6,862,515 B2
DATED : March 1, 2005
INVENTOR(S) : Bernhard Vogt

It is certified that error appears in the above-identified patent and that said Letters Patent is hereby corrected as shown below:

<u>Column 8,</u>
Line 41, delete "games" and insert -- gases -- therefor.

Signed and Sealed this

Seventeenth Day of May, 2005

JON W. DUDAS
*Director of the United States Patent and Trademark Office*